United States Patent [19]  
Mollard et al.

[11] 4,044,103  
[45] Aug. 23, 1977

[54] STORAGE-STABLE SODIUM CHLORITE

[75] Inventors: Paul Mollard, Sainte Foy les Lyon; Louis Mesaros, Ouillins, both of France

[73] Assignee: Produits Chimiques Ugine Kuhlmann, Paris, France

[21] Appl. No.: 433,659

[22] Filed: Jan. 16, 1974

[30] Foreign Application Priority Data

Feb. 5, 1973 France .................................. 73.03917

[51] Int. Cl.$^2$ .............................................. C01B 11/10
[52] U.S. Cl. ............................. 423/267; 423/266; 423/472
[58] Field of Search ............... 23/267, 472, 266, 275

[56] References Cited

U.S. PATENT DOCUMENTS

| 3,006,721 | 10/1967 | Mollard | 423/472 |
| 3,967,039 | 6/1976 | Ninane et al. | 423/472 |

FOREIGN PATENT DOCUMENTS

| 45-37135 | 11/1970 | Japan | 423/472 |
| 327,132 | 3/1972 | U.S.S.R. | 423/472 |
| 291,790 | 10/1953 | Switzerland | |
| 274,197 | 7/1927 | United Kingdom | |
| 888,637 | 1/1962 | United Kingdom | |

Primary Examiner—Edward Stern  
Attorney, Agent, or Firm—Pennie & Edmonds

[57] ABSTRACT

Sodium Chlorite is made stable under storage conditions by (1) admixing with the sodium chlorite a stabilizing salt chemically inert to sodium chlorite and having at least one hydrate whose melting point is higher than about 50° C, in amount such that said stabilizing salt can capture a quantity of water equal to at least about 5% of the weight of the sodium chlorite (NaClO$_2$), the weight of the water in the total mixture being at least about 5% of the weight of said sodium chlorite and (2) drying the mixture sufficiently to reduce the water not captured by the stabilizing salt to an amount equal approximately to zero. Sodium chlorite thus stabilized is thermally stable and does not congeal into a solid mass even when stored in drums for several months at 50° C.

13 Claims, No Drawings

4,044,103

STORAGE-STABLE SODIUM CHLORITE

BACKGROUND OF THE INVENTION

Sodium chlorite does not ordinarily remain stable on storage. The anhydrous form is particularly hazardous; any sudden heating can result in "hot points" which can cause explosive decomposition into chloride, chlorate and further degradation products of chlorate. In the form of its hydrate $NaClO_2, 3H_2O$ sodium chlorite is subject to changes in bulk volume and consistency unless the temperature is maintained at less than about 38° C. At higher temperatures sodium chlorite dissolves in its water of hydration. Thus it loses it granulated form and, on subsequent cooling, congeals into a hard solid mass occupying only a fraction of the original bulk volume. This extremely inconvenient circumstance is experienced particularly in warm climates.

To the best knowledge of the present inventors, no satisfactory solution has been proposed to the problem of storing sodium chlorite without both hazards of decomposition by heat and of congealing into a solid mass.

It has been proposed to stabilize sodium chlorite in the anhydrous form by dilution with inert solid substances, for example sodium nitrate. But in order to obtain a satisfactory degree of stabilization in this manner it is necessary to use the inert material in amounts as high as about 30 to 40% based on the weight of sodium chlorite, thus inordinately diminishing the effective chlorite level.

Present applicants have established that there is no risk of decomposition if the sodium chlorite contains at least about 5% by weight of water. When a sodium chlorite product thus containing about 5% or more water is exposed to sudden heating, the heat is absorbed by the water in sufficient amount to prevent chemical disproportionation. However, as mentioned above, sodium chlorite containing at least 5% water congeals into a solid mass if it is submitted to a temperature above about 38° C and subsequently cooled.

SUMMARY OF THE INVENTION

A simple and efficacious means has now been found whereby sodium chlorite can be stabilized to avoid both the risk of thermal decomposition and the risk of congealing into a solid mass, and without greatly diminishing the active level of sodium chlorite.

Briefly stated, the present invention is a method for stabilizing sodium chlorite comprising the steps of:

1. admixing with the sodium chlorite a stabilizing salt chemically inert to sodium chlorite and having at least one hydrate whose melting point is higher than about 50° C, in amount such that said stabilizing salt can capture a quantity of water equal to at least 5% of the weight of the sodium chlorite $NaClO_2$, the weight ratio of total water in the mixture being at least about 5% of the weight of said sodium chlorite and
2. drying the mixture sufficiently to reduce the water not captured by the stabilizing salt to an amount equal approximately to zero.

DETAILED DESCRIPTION

The sodium chlorite to be stabilized can initially be in anhydrous form, in the form of its hydrate or even in aqueous solution. When the chlorite is in a form containing less water than about 5% by weight, the stabilizing salt must have sufficient hydration at the time of its admixing and must be added in sufficient amount so that its water of hydration can bring the weight ratio of water/sodium chlorite ($NaClO_2$) up to at least about 5%. Instant inventors have found unexpectedly that even when the water is present as a hydrate of the stabilizing salt, it serves the function of absorbing any heat evenly and of avoiding the sudden formation of "hot pants".

When the stabilizing salt is selected according to the criteria stated above, Applicants have surprisingly ascertained that, regardless of the initial forms of hydration of the sodium chlorite and stabilizing salt respectively, the redistribution of water during subsequent drying takes place in such a manner that the sodium chlorite becomes dehydrated first.

Any stabilizing salt which can be used according to this invention must obviously be chemically inert to sodium chlorite. The stabilizing salt must also have at least one hydrate with a melting point higher than the ambient temperature under which the product is to be stored. While this temperature can vary according to the pertaining climatic conditions, it is preferred that the lowest melting point of the possible hydrates of the stabilizing salt should be at least about 50° C.

Salts which conform to the above-stated criteria can readily be recognized by those skilled in the art. Exemplarily, sodium phosphate $Na_3PO_4$ completely meets the requirements. It is chemically unreactive to sodium chlorite and it has a decahydrate stable up to about 65° C. On the other hand, although sodium acetate has a trihydrate which is stable up to about 58° C, it is unsatisfactory because it reacts chemically with sodium chlorite. In order to be useful in carrying out the instant invention, it is necessary that both stated limitations be met.

Among the salts which meet both limitations there are sodium phosphate, sodium metaborate, sodium hypochlorite, sodium pyrophosphate, potassium pyrophosphate, sodium carbonate, the mixed salt sodium potassium carbonate $KNaCO_3$, schonite $K_2Mg(SO_4)_2$, magnesium sulfate, magnesium chloride and calcium chloride. Other examples will occur to those trained in the art.

For the record, there may be mentioned sodium acid arsenate $Na_2HAsO_4$ which has a hydrate with $12H_2O$ which is stable up to about 100° C. This salt would be particularly effective if its poisonous nature would not be objectionable.

In carrying out this invention the amount of stabilizing salt added to the sodium chlorite must be sufficient to capture a weight of water equal to at least about 5% of the anhydrous weight of the sodium chlorite. The requirement can be expressed algebraically as follows. Let S represent a stabilizing salt which has a hydrate $S,nH_2O$. Let M represent the molecular weight (in grams) of the anhydrous form of S. Now if P grams of sodium chlorite are to be stabilized, the stabilizing salt must be able to capture at least 5% of P, or 0.05P grams. There must therefore be added at least $0.05 \cdot M \cdot P/18n$ grams of stabilizing salt (where 18 is taken as the molecular weight of water). Thus of y is defined as the minimum weight percentage of stabilizing salt to be added relative to the weight of sodium chlorite, $y = 5M/18n$ and is calculated on the basis of the anhydrous form of the stabilizing salt. The lower y needs to be, the less reduction in the level of chlorite activity in the product. It is therefore of particular interest to use stabilizing salts having relatively higher values of $n$. For example, the use of sodium phosphate $Na_3PO_4$ which has a decahydrate stable up to about 65° C particularly advantageous. On the contrary, sodium carbonate which has only one water of hydration is not commercially practical, even though this monohydrate is stable up to about 102° C. Comparatively, while only 4.6 grams of sodium phosphate is sufficient to stabilize 100 grams of sodium chlorite according to this invention, at least 30 grams of sodium carbonate would be required.

Drying according to this invention is carried out to remove any "surplus" water which is not potentially capturable by the stabilizing salt. This drying is carried out until the surplus water is approximately zero. Actually, the advantages of this invention can be obtained if a small amount of surplus water is present. An amount of $H_2O$ in the order of about 1 to 2% relative to $NaClO_2$, can be tolerated without risk of congealing the product, provided that the product is in the form of granules sufficiently large in size, such as when the granules are larger than about 2mm. in their smallest dimension. When the granules are thus sufficiently large, the points of contact between granules are sufficiently limited to avoid interference with the quality of stabilization.

The term "surplus water" is used in this application to designate the water not captured by the stabilizing salt, and includes any water of hydration combined with the $NaClO_2$ plus any "free water" which would be expected to react with the $NaClO_2$ or act as a solvent therefor. In order to obtain bulk stability with no tendency to congeal, the total weight of surplus water must be no more than about 2% of the weight of $NaClO_2$, preferably zero. Consequently the $NaClO_2$ in the product of this invention is substantially anhydrous.

Drying is preferably carried out at a temperature in the range of about 20°-50° C. However, higher temperatures can be used, limited only by the thermal stability of the hydrate of the particular stabilizing salt, and the drying procedure. Drying can be effected by any appropriate means accessible to those skilled in the art, for example fluid bed drying can be used.

Sodium chlorite capable of being stabilized by this invention can be of either pure or technical grade. Impurities contained in technical grades of sodium chlorite can moreover be used to contribute to the stabilizatiion when they are stabilizing salts according to the invention.

A preferred procedure is to admix the stabilizing salt at the conventional wet filter cake stage during the commercial manufacture of sodium chlorite.

Applicants have further found that mixtures of two or more stabilizing salts can be used in carrying out this invention, provided, of course, that the several such salts are compatible with each other and do not react to form unhydrated salts or hydrated salts of insufficient stability. It suffices, also when suitable mixtures of stabilizing salts are used, to introduce the salts in their anhydrous form to sodium chlorite containing about 5%, by weight, of water.

This invention will be further illustrated by description in connection with the following specific examples of the practice of it wherein, as also elsewhere herein, proportions are in parts by weight unless stated otherwise.

EXAMPLE I

In the course of the process of preparing sodium chlorite, a 5.154 gram sample of partially dried sodium chlorite filter cake was taken, using a sampling bucket, at the point of discharge at the rotating filter drum. Into this paste there was incorporated, at a temperature of 60° C, 600 grams of trisodium phosphate, $Na_3PO_4$, $12H_2O$, ground fine in a mixing machine. The obtained paste was granulated. The cylindrical granules having 3 mm. diameter and 6 mm. length had the following composition:

| | |
|---|---|
| $NaClO_2$ | 76.4% |
| $Na_3PO_4$ | 6.0% |
| $H_2O$ | 16.0% |
| inerts ($NaCl$, $NaClO_3$, ...) | 1.6% |

A 1.605 gram aliquot of these granules was placed in a fluid bed drier, covering a grating area of 157 cm², traveling through air preheated at 45° C. The air was circulated at a rate of 2 meters/sec. At the end of 15 minutes 1.321 grams of granules was recovered having the composition:

| | |
|---|---|
| $NaClO_2$ | 84.0% |
| $Na_3PO_4$ | 6.6% |
| $H_2O$ | 7.6% |
| inerts | 1.8% |

The test for suitability of the product in bulk, namely freedom from congealing, was carried out in the following manner: A glass tube (closed at the bottom end), 1 meter high and 6 cm. in diameter was filled with the product to a height of 0.75 meters representing the normal charge height of a drum of sodium chlorite. The filled tube was placed in an oven at 50° C and the behavior of the product was observed.

The chlorite stabilized according to this example was not changed in any observable way after 5 months' exposure to these conditions. Examination of the product by X-ray diffraction did not disclose the presence of any trihydrate $NaClO_2$, $3H_2O$.

For purposes of comparison unstabilized sodium chlorite, having the composition

| | |
|---|---|
| $NaClO_2$ | 81% |
| $Na_2SO_4$ | 5% |
| Misc. salts | 3% |
| $H_2O$ | 11% | was similarly placed in a glass cartridge at 50° C and found to collapse within the course of an hour, forming a paste occupying a space only up to 0.3 meters height. (This is not an illustration of the instant invention but demonstrates that the omission of the drying step, which is essential according to this invention, results in a dimensionally unstable product.)

Thermal stability was tested by placing either a flame or a heated iron rod in contact with the product and observing whether the decomposition reaction was propagated with a flame.

The product of this example successfully passed this test for thermal stability, showing no evidence of propagating any decomposition reaction. On exposure to flame or heated iron rod, the incipient decomposition was arrested in a few seconds.

EXAMPLE II

A sample of completely dried sodium chlorite filter cake, weighing 3.762 grams, was taken from an appropriate zone in the processing (contrasted to the wet sample taken in Example I at the discharge point of the filter drum). A 265 gram quantity of trisodium phosphate $Na_3PO_4, 12H_2O$ was introduced not in the form of a powder but in the form of an aqueous solution saturated at 70° C by addition of 170 grams water. After mixing and granulation as in the preceding example, granules were obtained having the composition:

| | |
|---|---|
| $NaClO_2$ | 80.0% |
| $Na_3PO_4$ | 6.8% |
| $H_2O$ | 13.0% |

After drying for 10 minutes at 45° C, the water content was lowered to 7.8%; thus the composition of the granules was changed to:

| | |
|---|---|
| $NaClO_2$ | 85.0% |
| $Na_3PO_4$ | 7.2% |
| $H_2O$ | 7.8% |

These granules passed successfully the tests described in Example I respectively for thermal stability and for freedom from congealing.

EXAMPLE III

This example illustrates the stabilization of sodium chlorite by the combined admixture therewith of both sodium phosphate and sodium sulfate.

A 1.496 gram sample of sodium chlorite cake was mixed with 316 grams of sodium phosphate $Na_3PO_4, 12H_2O$ and 212 grams of anhydrous sodium sulfate $Na_2SO_4$ in a mixing machine and granules were obtained as in the preceding examples. Assays before and after drying on a fluid bed were as follows:

| | Before drying | After drying |
|---|---|---|
| $NaClO_2$ | 71.2% | 79.0% |
| $Na_3PO_4$ | 6.0% | 6.6% |
| $Na_2SO_4$ | 9.3% | 10.3% |
| $H_2O$ | 13.5% | 4.1% |

The tests for stability and bulk properties were carried out as in Example I showed that the product of the present example is stable. The test for bulk behavior was terminated at the end of four months and the granules had maintained their original form and were easily detachable from each other.

EXAMPLE IV

This example is not an illustration of the instant invention but illustrates the importance of the limitation that the stabilizing salt must be chemically inert, i.e., unreactive, to the sodium chlorite.

A 1.620 gram sample of dried filter cake of sodium chlorite was mixed with 300 grams of sodium acetate $NaOOCCH_3, 3H_2O$. Granulation and drying were carried out as in the preceding examples. Composition of the granules before and after drying were as follows:

| | Before drying | After drying |
|---|---|---|
| $NaClO_2$ | 71.9% | 80.0% |
| $NaOOCCH_3$ | 9.4% | 10.5% |
| Inerts | 2.3% | 2.6% |
| $H_2O$ | 16.4% | 6.9% |

These granules showed no tendency to congeal but on being contacted with a flame or a heated iron rod underwent an immediate decomposition reaction which propagated itself with flame until the specimen was completely destroyed, quite differently from the performance in Examples I, II and III above, wherein the decomposition reaction was arrested within a few seconds.

EXAMPLE V

A sampling from the rotating filter had the composition:

| | |
|---|---|
| $NaClO_2$ | 83.6% |
| Inerts | 5.4% |
| $H_2O$ | 11.0% |

1.000 grams of this product was mixed at 60° C with a solution containing 127 grams of $CaCl_2, 2H_2O$ and 69 grams water.

The paste was granulated and after allowing the granules to harden in the air, the analysis was as follows:

| | |
|---|---|
| $NaClO_2$ | 71.8% |
| $CaCl_2$ | 4.6% |
| Inerts | 8.3% |
| $H_2O$ | 15.3% |

The granules were dried for 20 minutes in air at 50° C and the composition was then:

| | |
|---|---|
| $NaClO_2$ | 79.1% |
| $CaCl_2$ | 9.1% |
| Inerts | 5.1% |
| $H_2O$ | 6.7% |

These granules passed successfully the tests for thermal stability and maintenance of bulk characteristics described in Example I.

EXAMPLE VI

The procedure of Example V was followed except that 140 grams magnesium sulfate $MgSO_4, 7H_2O$ was used instead of the solution of calcium chloride. The obtained granules analyzes as follows:

| | |
|---|---|
| $NaClO_2$ | 79.7% |
| $MgSO_4$ | 6.0% |
| Inerts | 5.1% |
| $H_2O$ | 9.2% |

These granules had storage properties comparable with those of Example V; they were thermally stable and maintained constant bulk volume.

What is claimed is:

1. A method for stabilizing sodium chlorite which comprises the steps of
    1. admixing with sodium chlorite slurry an amount of stabilizing inorganic alkali metal or alkaline earth metal salt chemically inert to sodium chlorite and having at least one hydrate whose melting point is higher than about 50° C., the amount being sufficient to capture in the hydrate form a quantity of water equal to at least 5% of the weight of the sodium chlorite and insufficient to inordinately diminish the effective chlorite level, and the weight of water in the total mixture being at least 5% of the weight of said sodium chlorite; and 2. drying the mixture sufficiently at a temperature within the thermal stability temperatures of the hydrated stabilizing salt and the sodium chlorite, to reudce the water not captured to an amount not greater than about 2% of the weight of said sodium chlorite with, when noncaptured water is present, the mixture being comprised of granules having a diameter of at least about 2mm and the amount of uncaptured water being insufficient to form the trihydrate of the sodium chlorite salt.

2. The method of claim 1 wherein said sodium chlorite is produced as a wet filter cake and the stabilizing salt is added to the sodium chlorite while it is in the wet filter cake stage.

3. The method of claim 1 wherein the amount stabilizing salt is added is less than about 30-40% based on the weight of sodium chlorite.

4. A method for stabilizing sodium chlorite which comprises the steps of
1. admixing with sodium chlorite slurry an amount of stabilizing inorganic alkali metal or alkaline earth metal salt chemically inert to sodium chlorite and having at least one hydrate whose melting point is higher than about 50° C., the amount being sufficient to capture in the hydrate form a quantity of water equal to at least 5% of the weight of sodium chlorite and insufficient to inordinately diminish the effective chlorite level, and the weight of water in the total mixture being at least 5% of the weight of said sodium chlorite; and
2. drying the mixture sufficiently, at a temperature within the thermal stability temperatures of the hydrated stabilizing salt and the sodium chlorite, to reduce the water not captured by the stabilizing salt to an amount equal to about zero to eliminate the formation of the trihydrate salt of the sodium chlorite.

5. A method according to claim 4 in which the mixture is dried at a temperature in the range of about 20°-50° C.

6. The method of claim 4 wherein the amount of stabilizing salt added is less than about 30-40% based on the weight of sodium chlorite.

7. A method for stabilizing sodium chlorite which comprises the steps of
1. admixing with sodium chlorite slurry an amount of a mixture of stabilizing inorganic alkali metal or alkaline earth metal salts, each one of which salts is chemically inert to sodium chlorite and has at least one hydrate whose melting point is higher than about 50° C., the amount being sufficient to enable the stabilizing salts to capture in their respective hydrate forms a quantity of water equal to at least 5% of the weight of sodium chlorite and insufficient to inordinately diminish the effective chlorite level, and the weight of water in the total mixture being at least 5% of the weight of said sodium chlorite; and
2. drying the mixture sufficiently, at a temperature within the thermal stability temperatures of the hydrated stabilizing salts and the sodium chlorite, to reduce the water not captured by the mixture of stabilizing salts to an amount equal to about zero to eliminate the formation of the trihydrate salt of the sodium chlorite.

8. The method of claim 7 wherein the amount of the mixture of stabilizing salts to be added in less than about 30-40% by weight of sodium chlorite.

9. A method for stabilizing sodium chlorite which comprises the steps of
1. admixing with sodium chlorite slurry an amount of sodium phosphate sufficient to capture in the hydrate form a quantity of water equal to at least 5% of the weight of sodium chlorite and insufficient to inordinately diminish the effective chlorite level, and the weight of water in the total mixture being at least 5% of the weight of said sodium chlorite; and
2. drying the mixture sufficiently, at a temperature within the thermal stability temperatures of the hydrated stabilizing salt and the sodium chlorite, to reduce the water not captured by the sodium phosphate to an amount not greater than about 2% of the weight of said sodium chlorite with, when non-captured water is present, the mixture being comprises of granules having a diameter of at least about 2 mm and the amount of remaining uncaptured water being insufficient to form the trihydrate of the sodium chlorite salt.

10. The method of claim 8 wherein the amount of sodium phosphate added is about 4.6% based on the weight of sodium chlorite.

11. A method for stabilizing sodium chlorite which comprises the steps of
1. admixing with sodium chlorite slurry an amount of a mixture of sodium phosphate and sodium sulfate sufficient to capture in the respective hydrate preferentially forms a quantity of water equal to at least 5% of the weight of sodium chlorite; and insufficient to inordinately diminish the effective chlorite level, the weight of water in the total mixture being at least 5% of the weight of said sodium chlorite; and
2. drying the mixture sufficiently, at a temperature within the thermal stability temperatures of the hydrated sodium phosphate and sodium sulfate and sodium chlorite, to reduce the water not captured by the mixture of sodium phosphate and sodium sulfate to an amount not greater than about 2% of the weight of said sodium chlorite with, when non-captured water is present, the mixture being comprised of granules having a diameter of at least about 2 mm and the amount of remaining uncaptured water being insufficient to form the trihydrate of the sodium chlorite salt.

12. A granular composition consisting essentially of a stabilized sodium chlorite composition produced according to the method of claim 9.

13. A granular composition consisting essentially of a stabilized sodium chlorite composition produced according to the method of claim 11.

* * * * *

UNITED STATES PATENT AND TRADEMARK OFFICE
CERTIFICATE OF CORRECTION

PATENT NO. : 4,044,103
DATED : August 23, 1977
INVENTOR(S) : Paul Mollard and Louis Mesaros It is certified that error appears in the above-identified patent and that said Letters Patent are hereby corrected as shown below:

Column 2, Line 8, reads "pants", should read --points--

Signed and Sealed this

Seventh Day of February 1978

[SEAL]

Attest:

RUTH C. MASON
*Attesting Officer*

LUTRELLE F. PARKER
*Acting Commissioner of Patents and Trademarks*